(12) United States Patent
Nakamura et al.

(10) Patent No.: US 7,899,080 B2
(45) Date of Patent: Mar. 1, 2011

(54) DEMULTIPLEXER

(75) Inventors: Tetsuo Nakamura, Osaka (JP);
Tsutomu Hashimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 801 days.

(21) Appl. No.: 11/148,206

(22) Filed: Jun. 9, 2005

(65) Prior Publication Data

US 2006/0045142 A1    Mar. 2, 2006

(30) Foreign Application Priority Data

Aug. 25, 2004 (JP) ............................. 2004-244678

(51) Int. Cl.
H04J 3/24 (2006.01)
(52) U.S. Cl. ...................... 370/473; 370/542
(58) Field of Classification Search ................ 370/535, 370/536, 542, 916, 473, 474, 389
See application file for complete search history.

(56) References Cited

U.S. PATENT DOCUMENTS

| | | | |
|---|---|---|---|
| 5,668,810 A * | 9/1997 | Cannella, Jr. | 370/392 |
| 6,172,988 B1 * | 1/2001 | Tiernan et al. | 370/473 |
| 6,373,898 B1 * | 4/2002 | Langer et al. | 375/240.23 |
| 6,445,424 B1 * | 9/2002 | Erbar et al. | 348/554 |
| 6,647,202 B1 | 11/2003 | Yamaguchi et al. | |
| 6,654,389 B1 * | 11/2003 | Brunheroto et al. | 370/535 |
| 6,778,609 B2 * | 8/2004 | Nishizawa et al. | 375/240.25 |
| 7,010,003 B2 * | 3/2006 | Watanabe et al. | 370/522 |
| 7,248,740 B2 * | 7/2007 | Sullivan | 382/232 |
| 2005/0129020 A1 * | 6/2005 | Doyle et al. | 370/392 |

FOREIGN PATENT DOCUMENTS

| | | |
|---|---|---|
| EP | 0 872 839 A2 | 10/1998 |
| JP | 08-79709 | 3/1996 |
| JP | 08-273304 | 10/1996 |
| JP | 10-199162 | 7/1998 |
| JP | 11-261962 | 9/1999 |
| JP | 2000-106669 | 4/2000 |
| JP | 2001-086481 | 3/2001 |

OTHER PUBLICATIONS

Japanese Notice of Reasons for Rejections, w/ English translation thereof, issued in Japanese Patent Application No. JP 2004-244678 dated Jun. 30, 2009.
Japanese Notice of Reasons for Rejection, w/ English translation thereof, issued in Japanese Patent Application No. JP 2004-244678 dated Sep. 29, 2009.

* cited by examiner

*Primary Examiner*—Ricky Ngo
*Assistant Examiner*—Christine Ng
(74) *Attorney, Agent, or Firm*—McDermott Will & Emery LLP

(57) ABSTRACT

In a demultiplexer, a finite search length and a finite jump length are set in a packet header detection section. The packet header detection section skips from a transfer start position of a multiplexed stream according to the set jump length and then searches for a start code included in a packet header which is to be detected through a range designated by the search length. A payload separation section separates payloads included in the multiplexed stream based on detection results of the packet header detection section.

9 Claims, 2 Drawing Sheets

DEMULTIPLEXER

CROSS-REFERENCE TO RELATED APPLICATION

This application claims priority under 35 U.S.C. §119(a) on Japanese Patent Application No. 2004-244678 filed on Aug. 25, 2004, the entire contents of the specification, drawings and claims of which are hereby incorporated by reference.

BACKGROUND OF THE INVENTION

The present invention relates to a demultiplexer for separating desired data from a multiplexed stream.

In a DVD (Digital Versatile Disk) which is one of the optical disks, compressed/encoded data of video, sound, etc., is recorded. Data read out of the DVD is in the form of a multiplexed stream which is formed by a plurality of packets each including a packet header and a payload. Thus, a DVD player requires a demultiplexer for extracting a desired payload from the multiplexed stream and supplying the extracted payload to a decoder for decompression.

If a correct payload, i.e., correct data, is not supplied to the decoder, a decoding result of video, sound, or the like, includes disturbances. In the worst case, there is a possibility that the operation of the decoder stops (hangs).

According to a conventional technique disclosed in Japanese Laid-Open Patent Publication No. 8-79709, synchronization recovery of a decoder is realized based on sector synchronization information such that the time required for recovery since occurrence of an error is shortened.

In an optical disk compliant with the DVD standards, every packet header includes a start code without exception, and therefore, the packet header can be detected by a demultiplexer without fail. Further, a payload can be separated without fail based on information included in the packet header, such as payload length information, or the like.

However, in the case where an optical disk incompliant with the DVD standards is placed in a DVD player, there is a possibility that a demultiplexer misdetects a packet header. In this case, a wrong payload is supplied to a decoder. In the worst case, the decoder hangs as described above. This problem also occurs when inputting of a multiplexed stream to the demultiplexer is started from the middle of a packet.

SUMMARY OF THE INVENTION

An objective of the present invention is to provide a demultiplexer capable of suppressing misdetection of a packet header.

In order to achieve this objective, according to the present invention, a finite search length or finite jump length is set in a packet header detection section, and a start code included in a packet header which is to be detected is searched for based on the search length or jump length.

Specifically, the present invention is based on, as an assumption, a demultiplexer for extracting effective payloads from a multiplexed stream formed by a plurality of packets, each of which includes a packet header and a payload, the demultiplexer comprising: a packet header detection section for detecting packet headers in the multiplexed stream; and a payload separation section for separating payloads included in the multiplexed stream based on detection results of the packet header detection section. In this demultiplexer, a finite search length is set in the packet header detection section, and the packet header detection section searches for a start code included in a packet header which is to be detected through a range designated by the search length.

Based on the above assumption, a finite jump length may be set in the packet header detection section, and the packet header detection section skips from a transfer start position of the multiplexed stream according to the set jump length and then searches for a start code included in a packet header which is to be detected.

A start code of a packet is searched for through a range designated by a search length. Thus, even if ineffective data exists between packets, misdetection of a packet header is suppressed while unnecessary search for a start code is avoided.

A start code of a packet is searched for after skipping from a transfer start position of a multiplexed stream according to a set jump length. Thus, even if inputting of the multiplexed stream is started from the middle of the packet, misdetection of a packet header is suppressed while unnecessary search for a start code is avoided.

DESCRIPTION OF THE PREFERRED EMBODIMENTS

Hereinafter, an embodiment of the present invention is described with reference to the drawings.

Figure 1:
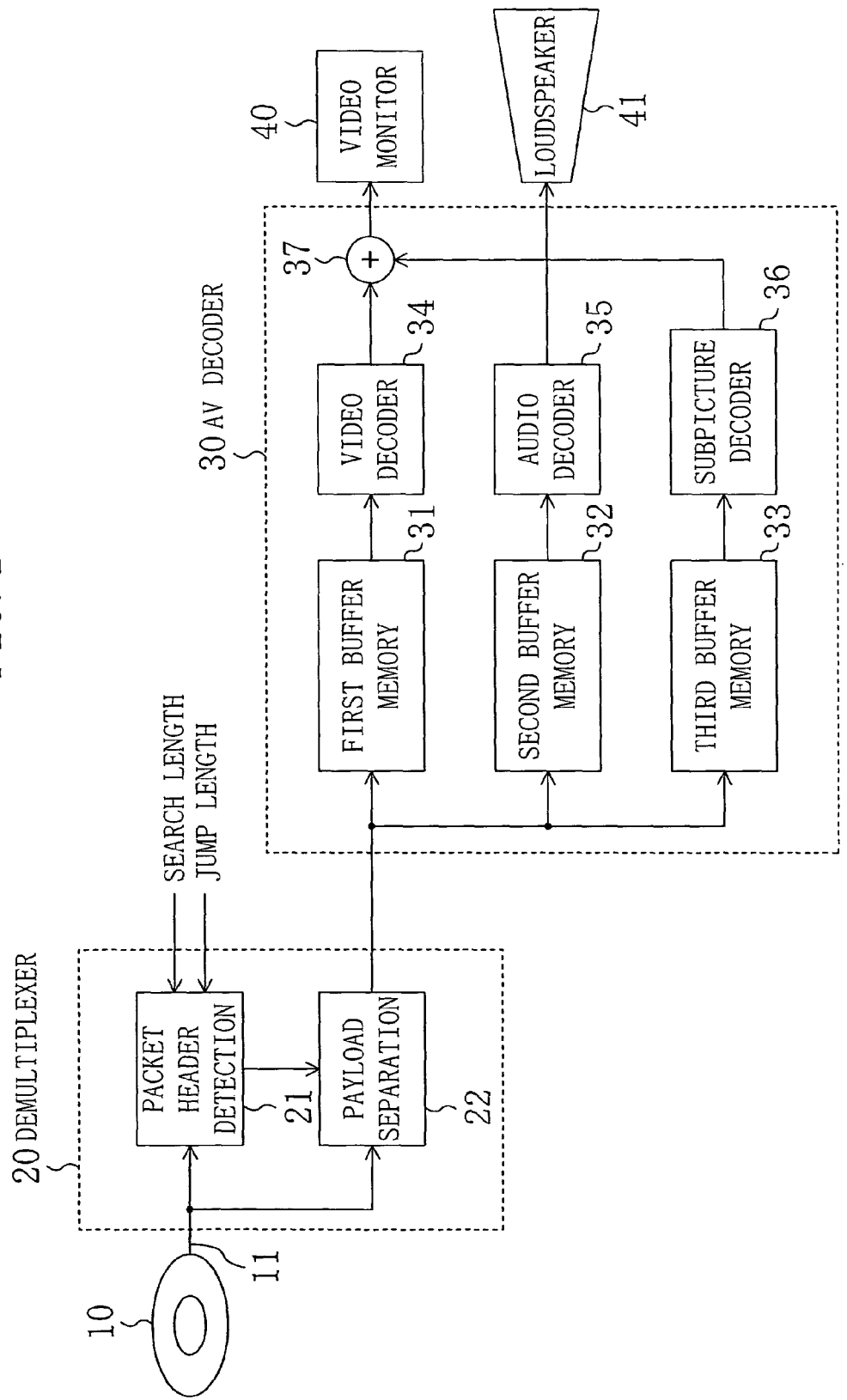
FIG. 1 is a block diagram of a DVD player which uses a demultiplexer according to one embodiment of the present invention.

FIG. 1 shows a DVD player which uses a demultiplexer according to one embodiment of the present invention. The DVD player of FIG. 1 includes a demultiplexer 20 and an AV decoder 30. An optical disk 10 is placed at the input side, and a video monitor 40 and a loudspeaker 41 are connected to the output side. The demultiplexer 20 receives a multiplexed stream 11 from the optical disk 10. It should be noted that an optical pickup, a demodulation circuit, an error correction circuit, etc., which are provided between the optical disk 10 and the demultiplexer 20, are omitted from the drawing.

The demultiplexer 20 extracts effective payloads from the multiplexed stream 11 formed by a plurality of packets each including a packet header and a payload and supplies the extracted payloads to the AV decoder 30. The demultiplexer 20 includes a packet header detection section 21 and a payload separation section 22. Each packet has a payload which includes any of the following compressed/encoded data: primary video data, sound data, and secondary video data (subpicture including subtitle information). The packet header detection section 21 sequentially detects the packet headers included in the multiplexed stream 11 based on a search length and a jump length previously set in the packet header detection section 21. The payload separation section 22 sequentially separates the payloads included in the multiplexed stream 11 based on detection results of the packet header detection section 21.

The AV decoder 30 decompresses a payload (compressed/encoded data) supplied from the demultiplexer 20 according to the attribute of the payload. The AV decoder 30 includes a first buffer memory 31, a second buffer memory 32, a third buffer memory 33, a video decoder 34, an audio decoder 35, a subpicture decoder 36 and a mixer 37. The first buffer memory 31 stores primary video payloads separated by the payload separation section 22. The second buffer memory 32 stores sound payloads separated by the payload separation section 22. The third buffer memory 33 stores secondary video payloads separated by the payload separation section 22. The video decoder 34 decodes primary video payloads output from the first buffer memory 31. The audio decoder 35 decodes sound payloads output from the second buffer memory 32. The subpicture decoder 36 decodes secondary video payloads output from the third buffer memory 33. The first buffer memory 31 is a bit buffer which is required by the video decoder 34 under the DVD standards. As well, the second buffer memory 32 is a bit buffer which is required by the audio decoder 35. The third buffer memory 33 is a bit buffer which is required by the subpicture decoder 36. The mixer 37 synthesizes a decoding result of the video decoder 34 and a decoding result of the subpicture decoder 36 to supply a signal which represents a result of the synthesis to the video monitor 40. The loudspeaker 41 receives a sound signal from the audio decoder 35.

Figure 2:
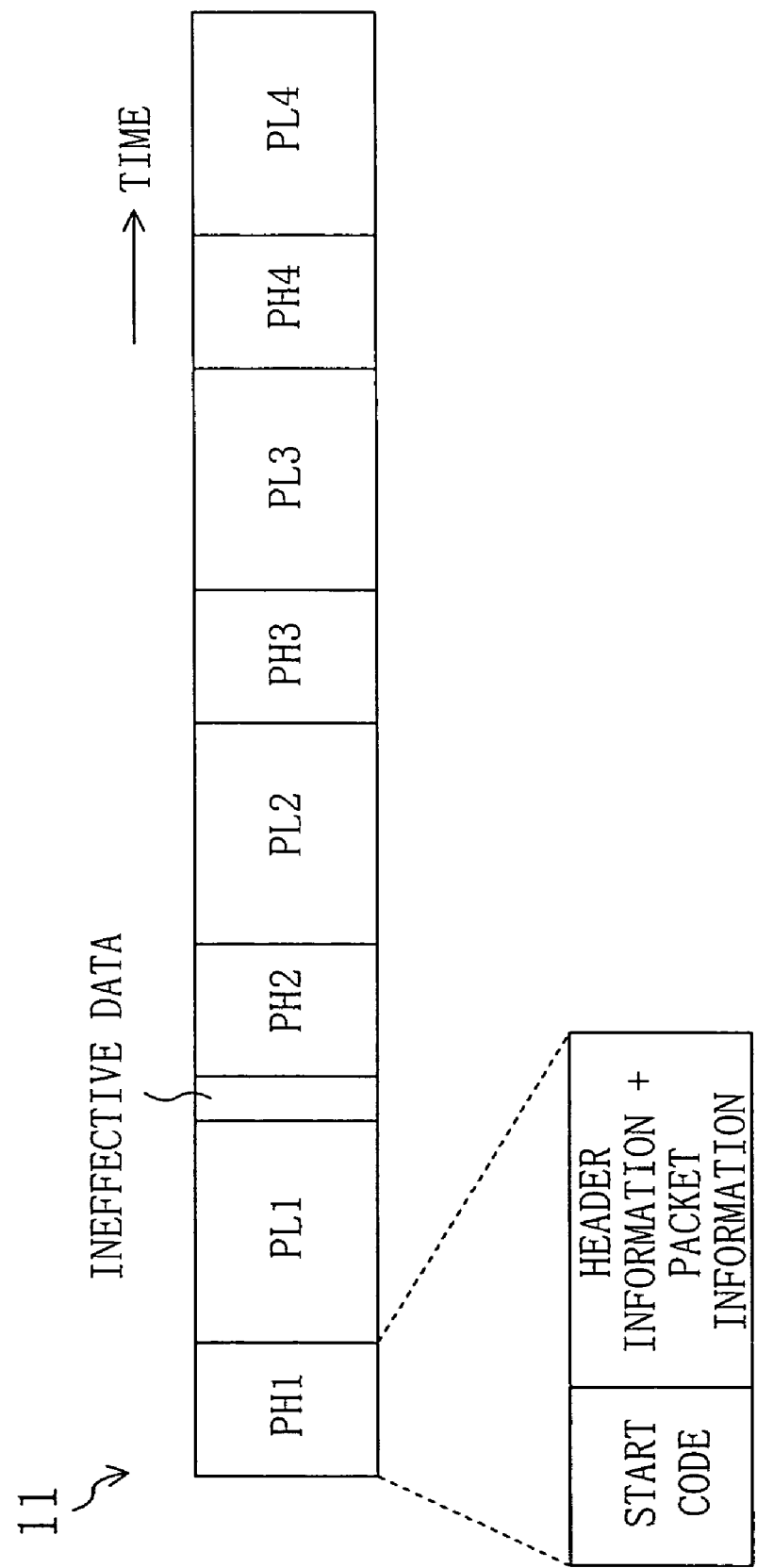
FIG. 2 shows an example of a multiplexed stream input to the demultiplexer of FIG. 1.

FIG. 2 shows an example of the multiplexed stream 11 which is supplied to the demultiplexer 20 of FIG. 1. FIG. 2 shows the first, second, third and fourth packets and ineffective data which exists between the first packet and the second packet. Segment PH1 is a first packet header, segment PL1 is a first payload, segment PH2 is a second packet header, segment PL2 is a second payload, segment PH3 is a third packet header, segment PL3 is a third payload, segment PH4 is a fourth packet header, and segment PL4 is a fourth payload. Each of the first to fourth packet headers PH1 to PH4 is formed by a start code at the leading part of the packet header and a subsequent part which contains header information and packet information. The subsequent part includes information of the payload length. Further, the multiplexed stream 11 includes unshown index data. In the index data, the start position of each of the packet headers PH1 to PH4 is written as an offset value from the leading end of the multiplexed stream 11.

Next, an operation of the demultiplexer 20 of FIG. 1 is described in detail on the assumption that all of the four packets which constitute the multiplexed stream 11 shown in FIG. 2 relate to primary video data.

The search length set in the packet header detection section 21 is determined according to the length of ineffective data previous to a packet header which is to be detected by the packet header detection section 21. Herein, it is assumed that the search length is set in consideration of a predicted length of the ineffective data shown in FIG. 2. The jump length set in the packet header detection section 21 is calculated from a transfer start position of the multiplexed stream 11 and a packet start position indicated by the index data included in the multiplexed stream 11. Herein, it is assumed that inputting of the multiplexed stream 11 is started from the leading end of the first packet. Thus, the set jump length is 0. It should be noted that at least one of the search length and jump length which is to be set in the packet header detection section 21 may be supplied from the outside of the demultiplexer 20.

The packet header detection section 21 searches for a start code included in the first packet header PH1 through a range designated by the search length to detect the first packet header PH1 without error. The payload separation section 22 separates the first payload PL1 without error based on the payload length information included in the detected first packet header PH1. The separated first payload PL1 is stored in the first buffer memory 31.

Next, the packet header detection section 21 searches for a start code included in the second packet header PH2 after jumping over the ineffective data subsequent to the first payload PL1. That is, the packet header detection section 21 searches for a start code through a range designated by the search length, whereby it is possible to skip the ineffective data to detect the second packet header PH2 without error. Herein, even if data which is the same as the start code of the second packet header PH2 is included in the ineffective data previous to the second packet header PH2, the true start code of the second packet header PH2 is found because the start code of the second packet header PH2 is searched for through the range designated by the search length. The payload separation section 22 separates the second payload PL2 without error not based on false information of the payload length which is obtained from the ineffective data but based on the correct payload length information included in the detected second packet header PH2. The separated second payload PL2 is stored in the first buffer memory 31.

Thereafter, in the same way, the third and fourth packet headers PH3 and PH4 are detected without error, and after every detection, the third and fourth payloads PL3 and PL4 are separated without error, respectively. The separated third and fourth payloads PL3 and PL4 are stored in the first buffer memory 31.

Alternatively, a plurality of search lengths may be set in the packet header detection section 21, and the plurality of search lengths may be selectively used according to the attribute of a payload which is to be separated. If the length of ineffective data previous to a packet header which is to be detected is long (for example, in the case of primary video data), a long search length is selected. If the length of ineffective data previous to a packet header which is to be detected is short (for example, in the case of sound data), a short search length is selected. In the case where misdetection of a packet header is likely to occur, a long search length is preferably selected by the packet header detection section 21. In the case where misdetection of a packet header is unlikely to occur, a short search length is preferably selected by the packet header detection section 21.

Lastly, an example where a finite jump length other than 0 is set in the packet header detection section 21 is described. For example, when inputting of a multiplexed stream 11 is started from the middle of the second payload PL2 of FIG. 2, the jump length set in the packet header detection section 21 is calculated from the relationship between the transfer start position of the multiplexed stream 11 (an intermediate position of the second payload PL2) and the start position of the third packet which is indicated by the index data included in the multiplexed stream 11. Thus, the packet header detection section 21 skips to the leading end of the third packet header PH3 and then searches for a start code included in the third packet header PH3 through a range designated by the search length, whereby the third packet header PH3 can be detected without error. That is, even if data which is the same as the start code of the third packet header PH3 is included in a range extending from the transfer start position of the multiplexed stream 11 to the trailing end of the second payload PL2, the true start code of the third packet header PH3 can be found out.

In the case where index data is placed at the trailing end of the multiplexed stream 11, the above-described operation including the calculation of the jump length may be performed after the multiplexed stream 11 is entirely buffered in the demultiplexer 20.

As described above, a demultiplexer of the present invention has such an advantage that misdetection of a packet header is suppressed while unnecessary search for a start code is avoided and is therefore useful for optical disk players, magnetic disk players, and the like. Further, the present invention is also applicable to systems which use multiplexed streams, such as digital broadcasting, internet communications, etc.

What is claimed is:

1. A demultiplexer for extracting effective payloads from a multiplexed stream comprising a plurality of packets, each of which includes a packet header and a payload, and ineffective data with an unknown length located between packets, the demultiplexer comprising:
   a packet header detector operable to detect packet headers in the multiplexed stream; and
   a payload separator operable to separate payloads included in the multiplexed stream based on detection results of the packet header detector, wherein:
   a finite search length is set in the packet header detector,
   the packet header detector searches for a start code included in a packet header which is to be detected through a range designated by the search length so as not to detect a false start code in the ineffective data,
   the search length is larger than the length of the start code, wherein:
   a plurality of search lengths are set in the packet header detector, and
   the packet header detector selectively uses the plurality of search lengths such that:
     if the length of the ineffective data previous to a packet header which is to be detected is long, the packet header detector selects a long search length, and
     if the length of the ineffective data previous to a packet header which is to be detected is short, the packet header detector selects a short search length.

2. A demultiplexer for extracting effective payloads from a multiplexed stream comprising a plurality of packets, each of which includes a packet header and a payload, and ineffective data with an unknown length located between packets, the demultiplexer comprising:
   a packet header detector operable to detect packet headers in the multiplexed stream; and
   a payload separator operable to separate payloads included in the multiplexed stream based on detection results of the packet header detector,
   wherein a finite jump length is set in the packet header detector, and
   the packet header detector skips from a transfer start position of the multiplexed stream according to the set jump length and then searches for a start code included in a packet header which is to be detected so as not to detect a false start code in the ineffective data.

3. The demultiplexer of claim 2, wherein the jump length set in the packet header detector is calculated from a relationship between a transfer start position of the multiplexed stream and a packet start position indicated by index data included in the multiplexed stream.

4. The demultiplexer of claim 2, wherein the jump length is externally set.

5. A demultiplexer for extracting effective payloads from a multiplexed stream comprising a plurality of packets, each of which includes a packet header and a payload, and ineffective data with an unknown length located between packets, the demultiplexer comprising:
   a packet header detector operable to detect packet headers in the multiplexed stream; and
   a payload separator operable to separate payloads included in the multiplexed stream based on detection results of the packet header detector,
   wherein a finite search length and a finite jump length are set in the packet header detector,
   the packet header detector skips from a transfer start position of the multiplexed stream according to the set jump length and then searches for a start code included in a packet header which is to be detected through a range designated by the search length so as not to detect a false start code in the ineffective data, and
   the search length is larger than the length of the start code.

6. The demultiplexer of claim 5, wherein the jump length set in the packet header detector is calculated from a relationship between a transfer start position of the multiplexed stream and a packet start position indicated by index data included in the multiplexed stream.

7. The demultiplexer of claim 5, wherein the jump length is externally set.

8. The demultiplexer of claim 5, wherein:
   a plurality of search lengths are set in the packet header detector; and
   the packet header detector selectively uses the plurality of search lengths such that:
     if the length of the ineffective data previous to a packet header which is to be detected is long, the packet header detector selects a long search length, and
     if the length of the ineffective data previous to a packet header which is to be detected is short, the packet header detector selects a short search length.

9. The demultiplexer of claim 5, wherein the search length is externally set.

* * * * *